Aug. 5, 1952     K. B. WILLIAMS     2,605,491
WINDSHIELD WIPER
Filed April 20, 1950     2 SHEETS—SHEET 1
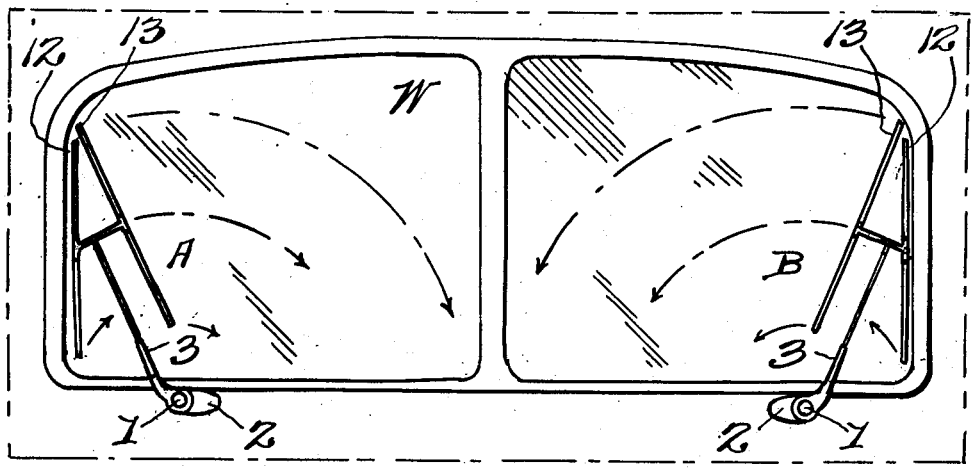
Fig. 1.
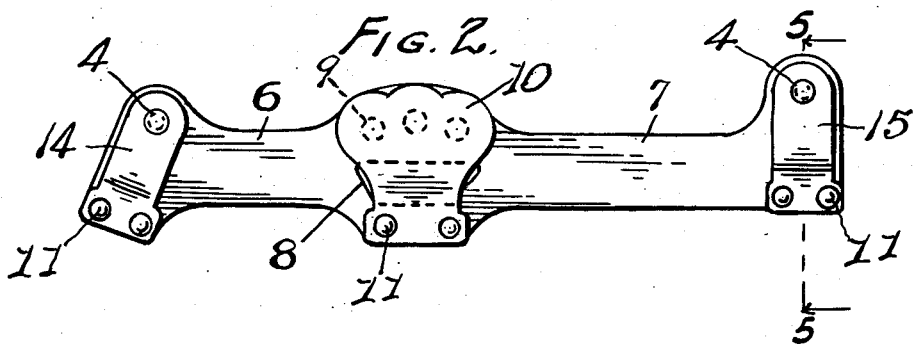
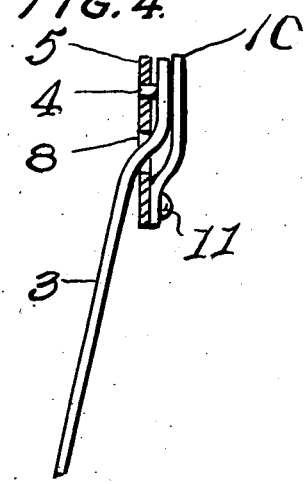
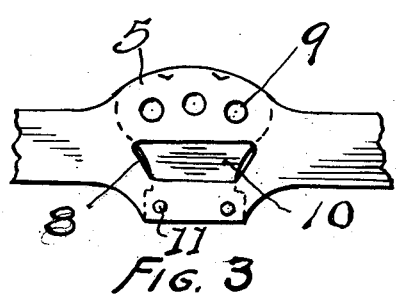
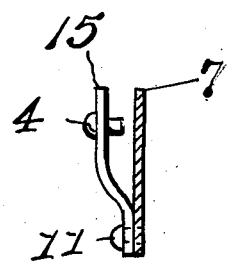
INVENTOR.
KEITH B. WILLIAMS
BY
Charles K. Davies & Son
Attys.

Aug. 5, 1952        K. B. WILLIAMS        2,605,491
WINDSHIELD WIPER
Filed April 20, 1950                           2 SHEETS—SHEET 2
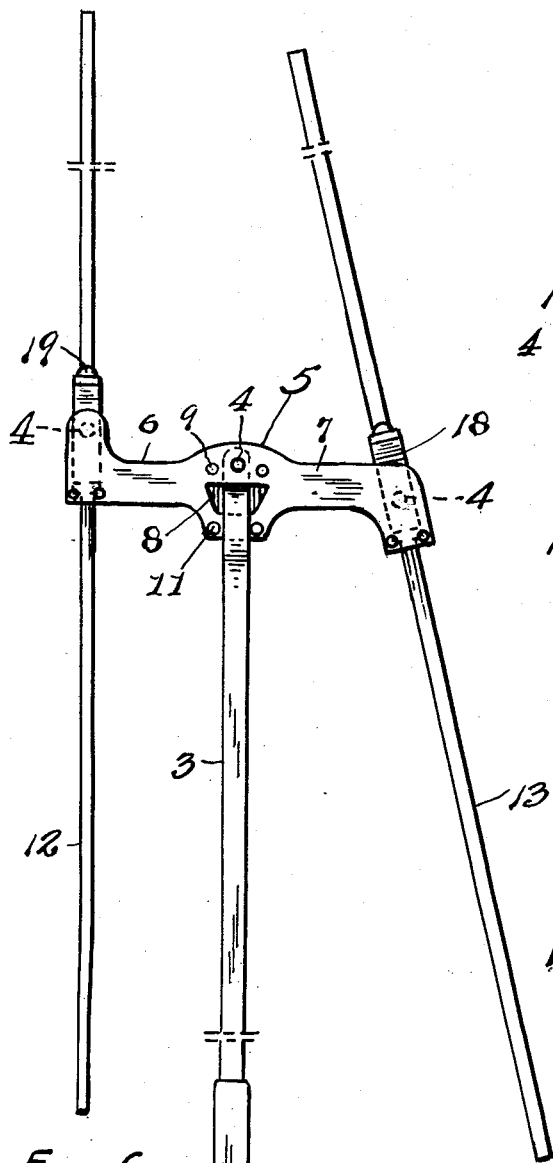
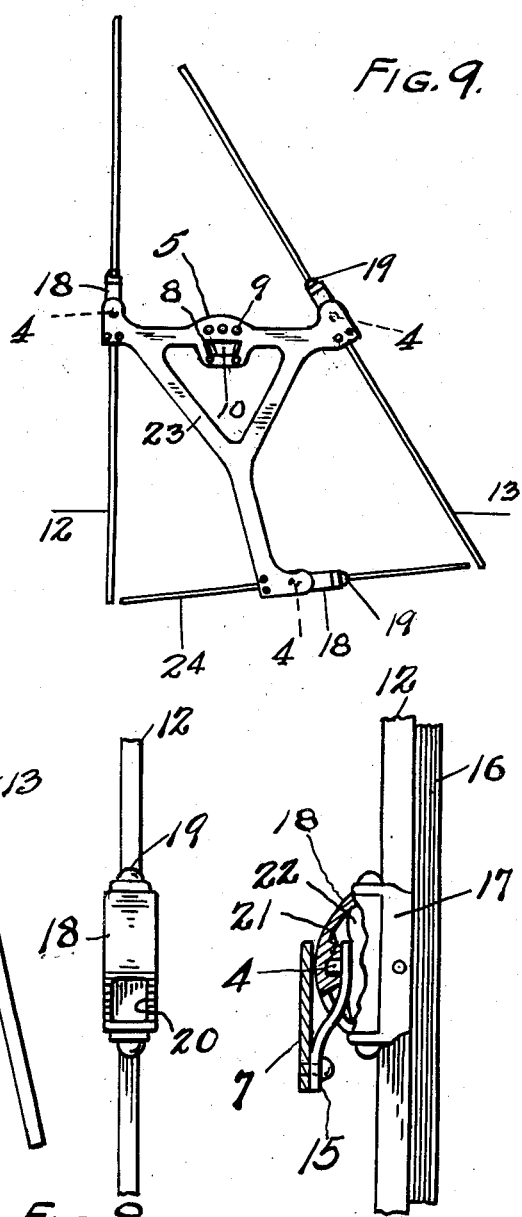
INVENTOR.
KEITH B. WILLIAMS
BY
Charles K. Davies & Son
Attys Patented Aug. 5, 1952

2,605,491

UNITED STATES PATENT OFFICE 2,605,491

WINDSHIELD WIPER

Keith B. Williams, Washington, D. C., assignor of one-half to Eugene W. Coughlin, Washington, D. C.

Application April 20, 1950, Serial No. 157,129

6 Claims. (Cl. 15—255)

My invention relates to the general class of power-operated attachments or cleaning appliances of the oscillating or reciprocating and swinging type having plural wiping elements, and more specifically to an improved windshield wiper, which while adapted for various purposes and uses, is especially designed for oscillating about a pivotal center to scrape and wipe snow, ice, and moisture from the windshield of an automotive vehicle.

Usually two opposed wipers or wiper assemblies are employed, each including wiping elements carried by an adapter, cross-head, or bracket, mounted upon or rigid with the free end of an operating arm or radius arm having a pivotal center.

By the use of the laterally spaced wiping elements carried by the adapter and arranged laterally of the oscillatable arm the overall length of the arcuate or segmental sweep of the wiping elements is substantially increased to clear a path of maximum area, and by selective location and arrangement of the installed wipers, a desired portion of different types of windshields may be cleared to insure maximum visibility.

In addition to the increased length of the arcuate or segmental sweep of the wiping elements, the radial length of the wiping elements may also be increased as desired to extend the path of the wipers.

In its physical embodiment the invention includes a minimum number of parts that may with facility be manufactured at comparatively low cost of production, and the parts may be assembled with convenience and installed with a minimum expenditure of time and labor for use with existing windshield wipers as well as for use with especially prepared appliances.

The invention consists essentially in certain novel features of construction and combinations and arrangements of parts as will hereinafter be described and more particularly pointed out in the appended claims.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these mechanical structures, within the scope of my claims, without departing from the principles of the invention.

Figure 1 is a view in elevation showing a windshield equipped with an opposed pair of wipers located at the right and left ends of the windshield.

Figure 2 is an enlarged view of the adapter or cross-head of a wiper.

Figure 3 shows the reverse side of the central portion of the cross-head.

Figure 4 is a transverse sectional view of the adapter or cross-head showing its detachable connection on the free end of the operating arm or oscillatable radius-arm.

Figure 5 is a transverse sectional view at line 5—5 of Fig. 2.

Figure 6 is a view in elevation, with parts broken away for convenience of illustration, of one of the wipers.

Figure 7 is a fragmentary view, partly in section, of one of the wiping elements mounted upon the adapter or cross-head.

Figure 8 is a fragmentary edge view of one of the wiping elements.

Figure 9 is a plan view of a modified form of the adapter, carrying triplicate wiping elements, the radius arm of the wiper being omitted for convenience of illustration.

In order that the general arrangement and utility of parts may readily be understood I show in Fig. 1 the opposed wipers located at the opposite ends of the windshield W, each in position to clear, especially, the end portions of the windshield for maximum visibility of the driver of an automobile and a passenger in the front seat, and the wipers A and B swing or oscillate under usual power as indicated by the dot and dash lines.

Adjacent each end of the windshield a power-operated rockshaft 1 is mounted in a bracket or base 2 that is welded or otherwise affixed to the cowl portion of an automotive vehicle, and the usual resilient radius arm 3 is affixed to the rockshaft to oscillate or swing across the front of the windshield.

As best indicated in Fig. 4 the upper free end of the resilient radius-arm is equipped with a projecting stud 4 for use in rigidly mounting, in selected position, the adapter or cross head that carries the two wiping elements.

The adapter may be stamped or pressed from sheet metal in desired shape, and as here shown it includes an enlarged head 5 and lateral arms 6 and 7 of unequal length and adapted to be angularly adjusted and mounted transversely of the free end of the radius arm.

For detachably mounting the adapter on the radius arm the head 5 of the adapter is cut out to form a longitudinally extending slot 8 and a spaced series of holes or sockets 9 are punched or drilled in the head on an arcuate line above the slot. For rigidly fastening the adapter on the radius arm the free end of the studded arm is slipped through the slot and the stud 4 of the arm is engaged in a selected hole or socket. For resiliently retaining the fastening stud in its socket, a resilient retaining jaw 10 of a size and shape to cover the arcuate series of sockets, is attached by welding, or by rivets as 11, to form a backing for the inserted end of the radius arm, and the retaining jaw bears against the radius-arm with sufficient force to prevent accidental displacement of the adapter from the radius-arm. By use of a selected socket the adapter may be mounted at right angles on the radius rod as shown, or the adapter may quickly be detached from the stud and swung to a selected diagonal position and then secured in adjusted position by engagement of the stud in a selected socket.

In this specific form and arrangement of the two wipers I have illustrated two duplicate and interchangeable, typical wiping elements mounted on the adapter laterally of the radius arm, and including an outer element 12 and an inner extension element 13 having their central fastening means located at varying distances from the rock shaft of a wiper.

On the same side of the adapter with the retaining jaw 10, and at the ends of the arms 6 and 7, are mounted a pair of upwardly projecting resilient fastening jaws 14 and 15 riveted at 11 to the ends of the arms, and each equipped with a projecting stud as 4. Preferably the attaching jaw 15 is alined parallel with the radius-arm in order that the extension wiping element 13 may be mounted in parallelism with the arm, and the jaw 14 is disposed at an angle to the longitudinal plane of the radius rod or arm so that the outer wiping element 12 may be mounted on the adapter at an angle to the radius arm. As indicated in Fig. 2 the stud of the jaw 15 is spaced a greater distance from the pivotal center, or rock shaft, of the radius arm than the stud of the jaw 14.

Thus by angularly adjusting the adapter on the radius rod; by varying the distance of the studs of the two jaws 14 and 15 from the rock shaft; and/or by varying the lengths of the two arms 6 and 7; the extension wiping element 13, at its outer end may be projected beyond the outer end of the outer element 12 to increase the overall length of the wiper.

By means of the two fastening jaws 14 and 15 the interchangeable wiping elements may quickly be attached to or detached from the supporting jaws 14 and 15.

In Figs. 7 and 8 a well known type of wiping element is illustrated with its rubber edge-strip 16 and attaching clip 17 to which a hollow metallic holder 18 is pivoted at 19 and provided with a slot 20 in its rounded face. The slot opens to the interior of the holder which may be fashioned with a boss 21 having a socket or depression to receive a stud as 4, and the usual backing, as a rubber or resilient cushion 22 is mounted within the holder for frictional engagement with the fastening jaw to retain the holder and jaw in proper operative position.

As indicated in Fig. 7 the wiping element is mounted upon the adapter or bracket by slipping the slot of the holder over the fastening jaw until the stud slips into the socket of the boss, and the frictionally engaged cushion or backing retains the jaw against accidental displacement of the stud, from its socket.

The location of the rock shafts, which may be operated by power from a pneumatic motor, an electric motor or in other suitable manner, with relation to the two outer end portions of the windshield may be varied as desired; and under some circumstances the two wipers and their rock shafts may be installed at opposite sides of the center line of the windshield to sweep and clear a maximum area at and away from the longitudinal center of the windshield.

While I have illustrated and described a novel and useful cross-head, bracket, or adapter, especially for supporting and carrying a pair of wiping elements of standard make, and also adapted for mounting upon the free end of a typical radius-arm, it will be understood that the adapter and the wiping elements as well as the radius arm may be otherwise arranged, and that the adapter, per se, is also susceptible of modification.

In the form of the invention illustrated in Fig. 9 I employ a triangular shaped adapter 23 with three supporting jaws, and three fastening studs as indicated by dotted lines, at 4.

The radially arranged wiping element 12 and the angular wiping element 13 are spaced laterally and disposed at opposite sides of the operating arm or radius arm, and an additional or third wiping element 24 is mounted on the adapter with its longitudinal axis transversely of and located between the two laterally spaced wiping elements 12 and 13, to clear the space of the windshield between the wiping elements 12 and 13.

The angularly disposed wiping element 13 may be mounted on the bracket or adapter in desired position as required for installation on a particular windshield to be cleaned in order that the blade of the wiping element will sweep the triangular area in either the inner or outer, lower corners which are not ordinarily cleaned by devices now in use.

The wiping elements may be of either uniform or varying length, and the relative positions of these elements may be varied; and the positions of the wiping elements with relation to the operating arm or radius arm may also be changed, in adapting the wipers to different positions on the windshield to attain maximum efficiency.

Having thus fully described my invention what I claim and desire to secure by patent is:

1. In a power operated attachment, the combination with a resilient and oscillatable radius-arm having an attaching stud at its free end, of a cross-head having a slot to receive said end and a spaced socket to receive the stud, a resilient jaw mounted on the cross-head for retaining the stud in its socket, and a pair of quick-detachable wiping elements mounted on the opposite ends of the cross-head at unequal distances from opposite sides of the arm.

2. In the power operated attachment described, the combination with a resilient and oscillatable radius arm having an attaching stud at its free end, of an angularly adjustable cross-head having a longitudinally extending slot to receive said end and a spaced arcuate series of selective sockets to receive the attaching stud, a resilient jaw mounted on the cross head for retaining the stud in a selected socket, and a pair of quick-detachable wiping elements mounted on the opposite ends of the cross-head.

3. In the power-operated attachment described, the combination with a resilient and reciprocable radius-arm, a cross-head mounted on the free end of the arm, and a pair of interchangeable wiping elements spaced laterally of the arm, said elements each having an attaching socket, of a resilient retaining jaw mounted on each end of the cross head, and a fastening stud on each jaw for coaction with a socket, for retaining the wiping elements in operative position.

4. In the wiper described, the combination with an oscillatable arm, an adapter, and means for mounting the adapter on the arm, of a plurality of wiping elements angularly disposed with relation one to another and located at unequal distances from the arm, and means for mounting the wiping elements on the adapter.

5. In the wiper described, the combination with an oscillatable arm, and an adapter rigid with the arm, of a wiping element carried by the adapter at a short distance from one side of and parallel with the arm, and a second wiping element carried by the adapter located at a greater distance from the opposite side of the arm and disposed at an angle to the first mentioned wiping element.

6. In the wiper described, the combination with an oscillatable arm, an adapter having triangular spaced supporting means, and means for mounting the adapter on the arm, of two wiping elements spaced laterally of the arm, a third wiping element disposed with its longitudinal axis transversely of and located between the two spaced wiping elements, and means on each wiping element coacting with a supporting means for fastening the wiping elements on the adapter.

KEITH B. WILLIAMS.

REFERENCES CITED

The following references are of record in the file of this patent:

UNITED STATES PATENTS

| Number | Name | Date |
|---|---|---|
| 1,140,001 | Runge | May 18, 1915 |
| 1,658,312 | Trimble | Feb. 7, 1928 |
| 1,938,840 | Kleven | Dec. 12, 1933 |
| 2,147,113 | Smulski | Feb. 14, 1939 |
| 2,285,618 | Scinta | June 9, 1942 |
| 2,446,401 | Ziskind | Aug. 3, 1948 |